(12) United States Patent
Marros et al.

(10) Patent No.: US 10,801,186 B2
(45) Date of Patent: Oct. 13, 2020

(54) INTEGRATED SYSTEM AND METHOD TO DETERMINE ACTIVITY OF EXCAVATION MACHINERY

(71) Applicant: OPERATIONS TECHNOLOGY DEVELOPMENT, NFP, Des Plaines, IL (US)

(72) Inventors: Robert Marros, Chicago, IL (US); Saurav Acharya, Des Plaines, IL (US); Jason Sphar, Mount Prospect, IL (US); Steven Blitzstein, Highland Park, IL (US)

(73) Assignee: OPERATIONS TECHNOLOGY DEVELOPMENT, NFP, Des Plaines, IL (US)

( * ) Notice: Subject to any disclaimer, the term of this patent is extended or adjusted under 35 U.S.C. 154(b) by 373 days.

(21) Appl. No.: 15/659,817

(22) Filed: Jul. 26, 2017

(65) Prior Publication Data

US 2018/0038081 A1    Feb. 8, 2018

Related U.S. Application Data

(60) Provisional application No. 62/371,051, filed on Aug. 4, 2016.

(51) Int. Cl.
*E02F 9/26* (2006.01)
*G01S 19/49* (2010.01)
*G01S 19/14* (2010.01)
*G01S 19/13* (2010.01)

(52) U.S. Cl.
CPC .............. *E02F 9/261* (2013.01); *E02F 9/264* (2013.01); *G01S 19/14* (2013.01); *G01S 19/49* (2013.01); *G01S 19/13* (2013.01)

(58) Field of Classification Search
CPC ...... B64D 17/80; G05D 1/042; G05D 1/0808; G05D 1/105; A63H 2200/00; B64G 1/12; B64G 2001/1064
See application file for complete search history.

(56) References Cited

U.S. PATENT DOCUMENTS 6,205,377 B1 * 3/2001 Lupash ................... G01S 19/20
                                                      342/357.58
7,482,973 B2    1/2009 Tucker et al.
7,834,806 B2   11/2010 Tucker et al.
8,081,112 B2   12/2011 Tucker et al.
(Continued)

OTHER PUBLICATIONS

Gabe Sibley, 'A Sliding Window Filter for SLAM', Aug. 8, 2006, USC, pp. 1-17 (Year: 2006).*

*Primary Examiner* — Elias Desta
(74) *Attorney, Agent, or Firm* — Pauley Erickson & Swanson

(57) ABSTRACT

A system and method for monitoring and alerting of a working equipment proximity to a utility system. The invention provides a device on the working equipment with sensors and GPS location capabilities to determine location and/or movement event data of the equipment. The invention further includes the establishment of an imaginary buffer boundary established around the utility components to use in combination with the event data to provide a reference for alerts to be triggered. Alerts are automatically provided by the system and method at the working equipment and/or a remote operator dashboard.

19 Claims, 4 Drawing Sheets

(56) References Cited

U.S. PATENT DOCUMENTS

| | | | |
|---|---|---|---|
| 9,213,905 B2* | 12/2015 | Lange | G06K 9/00805 |
| 2009/0259399 A1* | 10/2009 | Kotejoshyer | G01S 7/4802 |
| | | | 701/300 |
| 2018/0264640 A1* | 9/2018 | Holloway | B05B 12/122 |

* cited by examiner

INTEGRATED SYSTEM AND METHOD TO DETERMINE ACTIVITY OF EXCAVATION MACHINERY

CROSS REFERENCE TO RELATED APPLICATION(S)

This application claims the benefit of U.S. Provisional Patent Application Ser. No. 62/371,051, filed on 4 Aug. 2016. The Provisional patent application is hereby incorporated by reference herein in its entirety and is made a part hereof, including but not limited to those portions which specifically appear hereinafter.

BACKGROUND OF THE INVENTION

Field of the Invention

This invention relates generally to a system and method for determining and monitoring activity of excavation or agricultural machinery, such as near utility systems.

Discussion of Related Art

Currently, some equipment manufacturers build functionality into newer construction equipment that provides telemetry to indicate the general location of construction equipment. Other more advanced systems can also be installed on various parts of the construction equipment to discretely provide movement information for different aspects of construction equipment. There is a continuing need for improved method of monitoring the safe operation of construction equipment, such as near electrical lines or gas/water pipelines.

SUMMARY OF THE INVENTION

The invention includes a system and method for monitoring excavation machinery near utility systems. The invention provides equipment mounted devices for alerting equipment operators and/or remote monitoring and alerting interfaces.

Embodiments of this invention include an equipment-mounted device with a processor and a recordable medium including encoded instructions for collecting and forwarding equipment event data (e.g., location, movement) to a processing application that characterizes activity of the equipment and utilizes spatial location information and compares physical movements of equipment with a buffered boundary that is established based on a physical location of one or more components of a utility system.

The invention further provides a system or device for monitoring and alerting working equipment movement near utility systems. The system or device includes a sensor system including at least one motion sensor mounted to the working equipment. A satellite navigation receiver is likewise mounted to the working equipment. A computing module is in combination with the sensor system and the satellite navigation receiver. The computing module includes a processor and a recordable medium including encoded instructions for collecting sensor data and spatial location data, characterizing an activity of the working equipment, and comparing, as a function of the spatial location information, physical movements of the equipment with a predetermined buffered boundary established around one or more components of a utility system. In embodiments of this invention, the computing module automatically determines a proximity of the working equipment to the buffered boundary as a function of the spatial location data from the satellite navigation receiver and Geographic Information Systems (GIS) data. The computing module also desirably automatically determines a working motion of the working equipment from motion data determined by the at least one motion sensor and compares the working motion to the buffered boundary.

Embodiments of the subject invention include an integrated computing system with an Internet of Things (IoT) apparatus having a device mounted on a construction vehicle or agricultural vehicle to collect, process and alert the state of the equipment to reduce excavation damage to a utility system in real-time. The IoT apparatus preferably includes, without limitation, a computing module with cellular service, GNSS, and a motion sensor including accelerometer, gyroscope, orientation, temperature, and/or pressure sensor.

A device is mounted on working equipment and includes encoded software instructions that collect and forward event data to a local or remote data stream processing application that characterizes the activity of the working equipment. The computing system then uses the spatial location information and compares the movements with buffered boundaries established based upon on and around the physical location of the utility system. The data gathered, received, and processed by the system is automatically used in algorithms to determine the state of the vehicle. Machine learning concepts can be applied to assist in the identification of the vehicle state. The system sends alerts and warnings via an operations dashboard, cellular phone calls, text messages, and/or emails when a condition is met that requires further reduction or elimination of third-party excavation damage and/or construction or agricultural equipment monitoring.

Embodiments of the subject invention include a configured computing system with multiple software platforms to collect, store, process, and manage spatial location information and motion sensor data, and that participates in a structured processing mechanism to characterize movement and state of equipment or machinery that has the potential to damage an underground utility. The structured processing mechanism desirably identifies, classifies, and reports the type of machine that is sending data to the system.

Embodiments of the subject invention include a computational model that can continuously characterize, classify, and report activity of equipment or machinery in real-time from motion sensor data sent/received from a device in the field. The computational model desirably has the ability to self-learn from data sent/received from the device in the field.

Embodiments of the subject invention include a collection of data inputs, outputs, and processors to form dynamic spatial buffered boundaries (e.g., imaginary boundaries overlaying GIS map data) based on infrastructure (e.g., gas pipe size, pressure, consequence) or machine type/size (e.g., type of backhoe/excavator, reach of boom, varying potential for damage) working together, and/or to dynamically increase/decrease the size of the alerting boundary mechanism.

Embodiments of the subject invention include a protocol to identify the device information in the lead or system configuration message for the equipment mounted device and a subsequent data message to produce the operational information of the equipment mounted device. Binary messages can be decoded by the recipient messaging platform, processed, and sent through a server to be recorded in the GIS.

Embodiments of the subject invention include a method to collect data from a device in the field, identify spatially relevant data in a spatial processing application (e.g., Esri GeoEvent Server™), enrich the data, forward to a message handling software application (e.g., Apache Kafka™), process the data in real-time (e.g., Apache Spark™), send appropriate alert messages based on the result to the device, forward the result back to the spatial processing application (e.g., Esri GeoEvent Server™), enrich the data, and record results in a database and display in a user-facing application.

Embodiments of the subject invention include a computing system and method comprising a message handler exposed to the Internet, a messaging platform to process incoming data, a real-time mapping and analytics platform, and a real-time big data processing engine wherein the incoming data from the field-based device will be collected, processed, identified for spatial relationship, characterized based on device motion and the result delivered to an end-user via email, text message, or other visual interface.

Embodiments of the subject invention include a method to collect device registration information from the installation procedure and register the device on the system, including the required data to automatically identify within the system information a relationship from the physical device to the data collected by the computing system. The process to collect the data during the installation of the device includes collection of a device identifier, photos of the installation, and other pertinent information related to the installer, the equipment that the device was installed on and contact information for the purposes of sending alerts and maintenance information.

BRIEF DESCRIPTION OF THE DRAWINGS

These and other objects and features of this invention will be better understood from the following detailed description taken in conjunction with the following drawings.

DESCRIPTION OF PREFERRED EMBODIMENTS

The subject invention includes an enhanced system of components to provide the ability to consume and process a unique set of attributes from a device placed on construction or agricultural equipment and including a multitude of functionalities and/or sensors, such as, without limitation, cellular connectivity, GNSS/GPS receivers/antennas, accelerometers, orientation sensors, gyroscopes, temperature sensors, humidity sensors, and/or pressure sensors. The data from these modules or sensors is sent and processed in real-time by a computing module, such as including a geoevent processor and other software components and algorithms to provide an indication of the excavation activity of the equipment to which the device is attached. Information is desirably provided in real-time via a graphic user interface dashboard. The system also utilizes geographic information systems (GIS) data including, for example, spatial locations of the underground utility (electric, gas, water, telecom, other underground utility) and 811 (underground locating system) data to further refine and eliminate false-positives when providing decision support data to the persons receiving the information and warnings or alerts via the dashboard, cellular text or phone calls, and/or emails.

In embodiments of this invention, the system and method of this invention compare physical movements of equipment with a buffered boundary based upon a physical location of one or more components or a utility system. As used herein, a "buffered boundary" refers to an imaginary boundary established around at least a portion of the utility system of utility line. The system and method of this invention automatically determine a distance of the physical movements of the equipment from the buffered boundary and issue alerts, e.g., alarms and/or messages, when the working equipment contacts and/or approaches the established buffered boundary. In embodiments of this invention, the buffered boundary is established at a predetermined distance from or about one or more components of the utility system, such as, for example, 50 feet on either side of a gas line. The size and shape of the buffered boundary can vary depending on need and the particular utility and/or working equipment. Desirably, the buffered boundary is large enough to take into account any inaccuracies in the detection systems of this invention and components thereof. In embodiments of this invention, the system includes encoded instructions for dynamically adjusting the buffered boundary placement and/or sizing as a function of, for example, the size and/or contents of the pipe, etc. and the particular working equipment.

Figure 1:
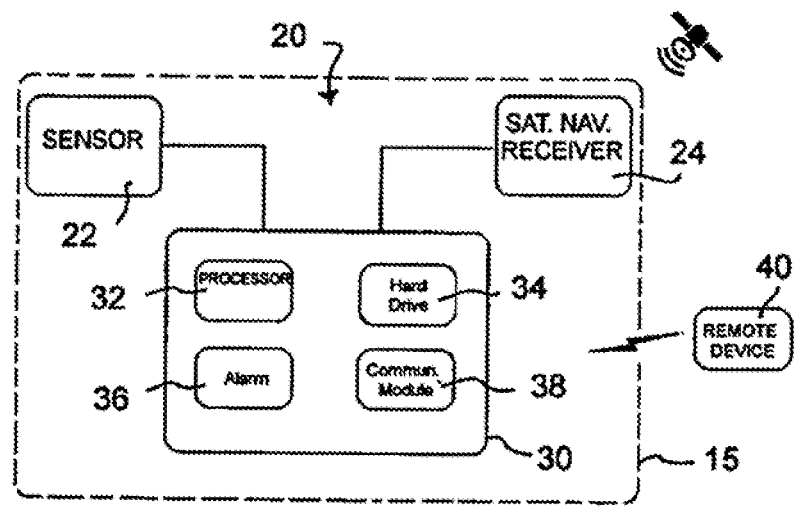
FIG. 1 generally illustrates a system or device for monitoring and alerting working equipment movement, according to embodiments of this invention.

FIG. 1 generally illustrates a system for monitoring and alerting working equipment movement, e.g., ground moving activities, near utility systems, according to embodiments of this invention. A device 20 is mounted on, for example, a construction vehicle, agricultural vehicle, or excavation vehicle, representatively shown as working equipment 15, to collect, process, and/or characterize the state of the working equipment 15 and compare physical movements of the working equipment 15 with an established buffered boundary to reduce excavation damage to a utility system in real-time.

The device 20 includes a sensor system 22 including at least one motion sensor mounted to the working equipment 15. The sensor system 20 senses event data, including activity data and/or motion data, such as movement of the entire working equipment or parts thereof (e.g., an excavator arm or rotary component). Exemplary sensors for use in the sensor system include, without limitation, accelerometers, orientation sensors, gyroscopes, magnetometers, proximity sensors, direction sensors (e.g., compasses), rotational vector sensors, light sensors, temperature sensors, humidity sensors, and/or pressure sensors. In presently preferred embodiments, the sensor system includes a nine degree of freedom motion sensor. The sensors of the sensor system 22 may be contained in a housing of the device, and/or positioned as needed on one or more positions of a particular working equipment 15, depending on the type of equipment and sensors used.

The device 20 includes a satellite navigation receiver 24 mounted to the working equipment 15. The satellite navigation receiver 24, in combination with global positioning satellites, provides spatial location data as a part of the event data for the working equipment 15. Any suitable satellite navigation receiver can be used in this invention, depending on need.

The device 20 further includes a controller 30 in combination with the sensor system 22 and the satellite navigation receiver 24. The controller 30 includes a processor 32 and a recordable medium 34 including encoded instructions for collecting and/or processing sensor data from the sensor system 22 and/or spatial location data from the receiver 24. The recordable medium can be any suitable non-transitory medium, such as a hard drive or a flash drive. The controller 30 also includes an alarm module 36 adapted to issue an alarm sound or message as the working equipment 15 approaches or contacts a buffered boundary created around the utility system. The controller 30 further includes a communication module 38 adapted to wirelessly communicate with a remote electronic device 40 event data, a proximity of the working equipment to the buffered boundary, and/or any necessary alert.

Figure 2:
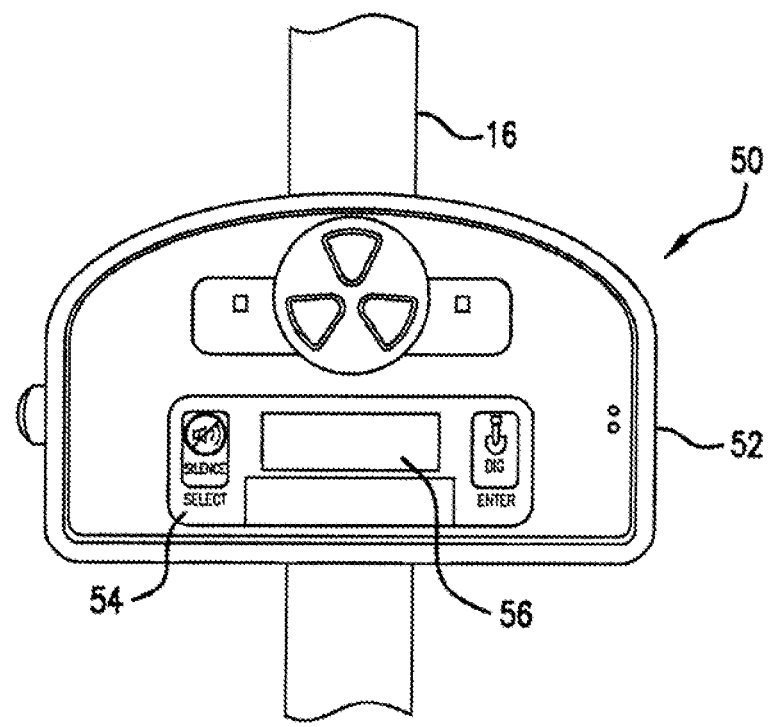
FIG. 2 illustrates a device for monitoring and alerting working equipment movement, according to one embodiment of this invention.

FIG. 2 shows a device 50 for monitoring and alerting working equipment movement, according to one embodiment of this invention. The device 50 is mounted, for example, within a working vehicle driver cab 16 to collect, process, and, in combination with a local and/or remote computing module, characterize the state of the working equipment to reduce excavation damage to a utility system in real-time. The device 50 includes a housing 52 mounted to the cab 16, and at least partially enclosing the motion sensor, the satellite navigation receiver, and the computing module, such as described in FIG. 1. The device 50 can be integrated at cab manufacturing or added as a retrofit. The device 50 includes an alarm 54, an LCD screen 56, and any other mechanism for proving information or warnings to the equipment operator. Radio and/or cellular communication mechanisms, etc., can also be incorporated for communicating between the remote dashboard and the operator.

In embodiments of this invention, the devices of FIGS. 1 and 2 provide or include an integrated computing system and an Internet of Things (IoT) apparatus for a construction vehicle or agricultural vehicle to collect, process and characterize the state of construction equipment to reduce excavation damage to a utility system in real-time. The IoT apparatus preferably includes a computing module with cellular service, GNSS, and a nine degree of freedom (9DOF) motion sensor providing accelerometer, gyroscope, orientation, temperature, and pressure data. The event data provided by the device is preferably wirelessly transmitted over a cellular network and received by a cloud-based (or on-premise) server running GIS software (e.g., Esri's ArcGIS Server™, GeoEvent Processor™, Apache Spark™, Hadoop™, ElasticSearch™, Apache Kafka™ and other messaging software).

Figure 3:
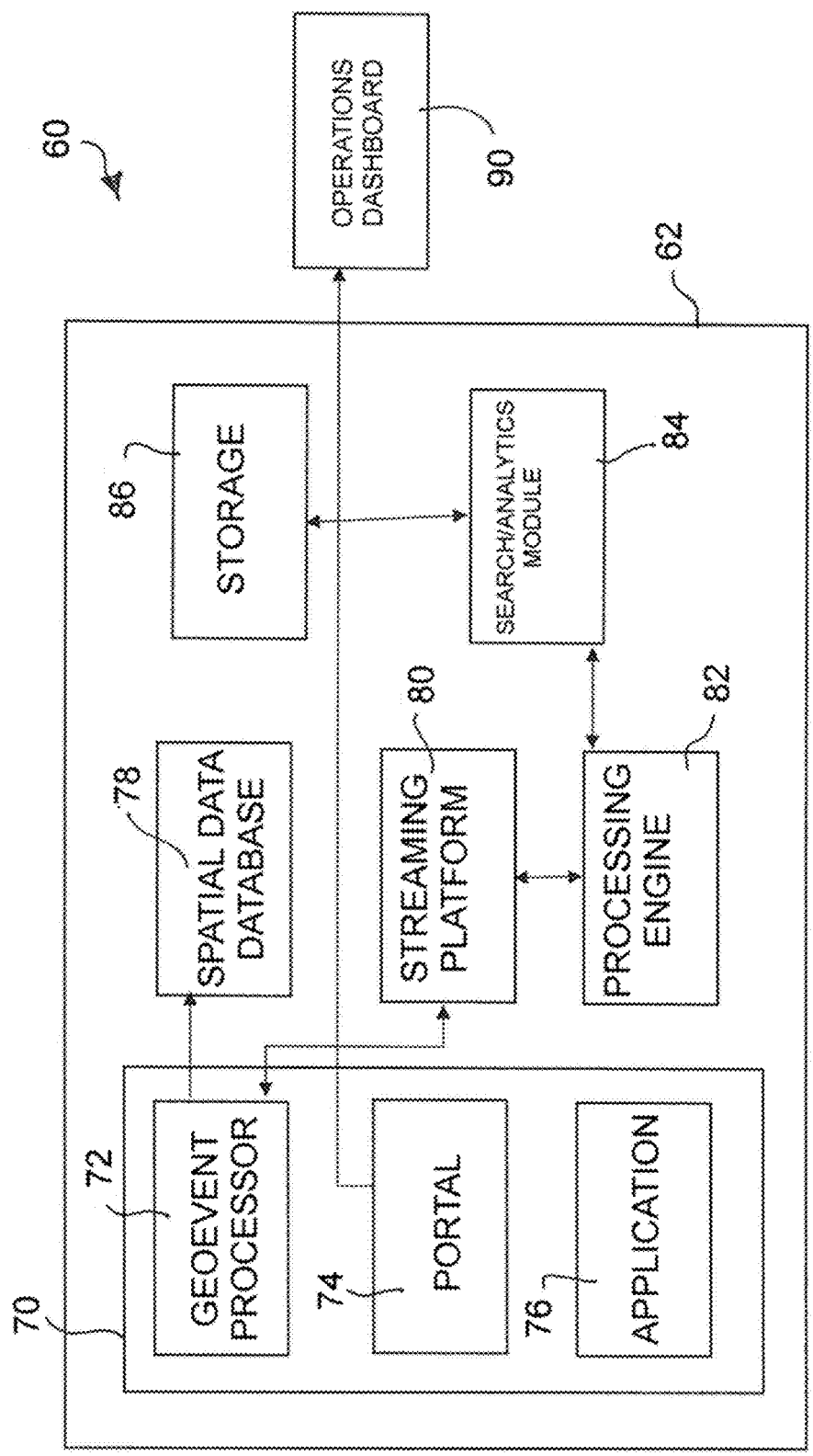
FIG. 3 representatively shows a model architecture for the system of this invention.
Figure 5:
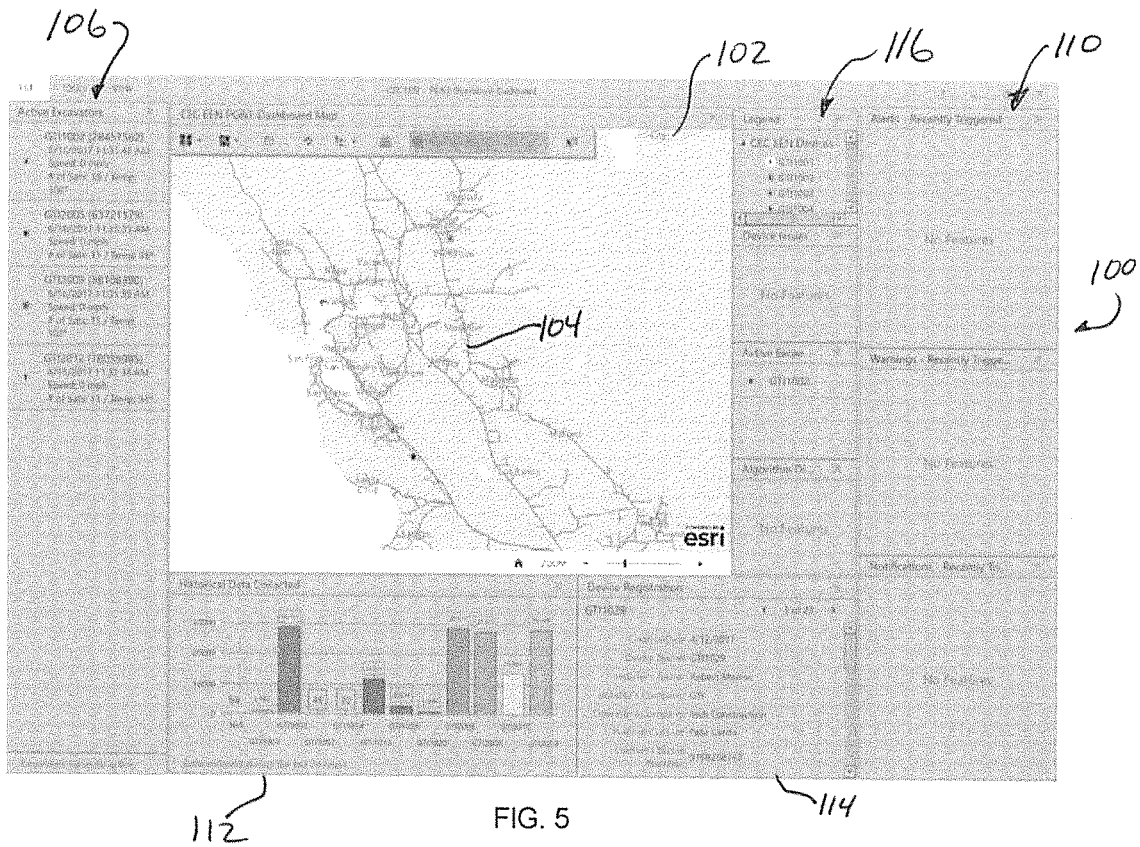
FIGS. 5 and 6 illustrate an exemplary operations dashboard graphical user interface, according to one embodiment of this invention.
Figure 6:
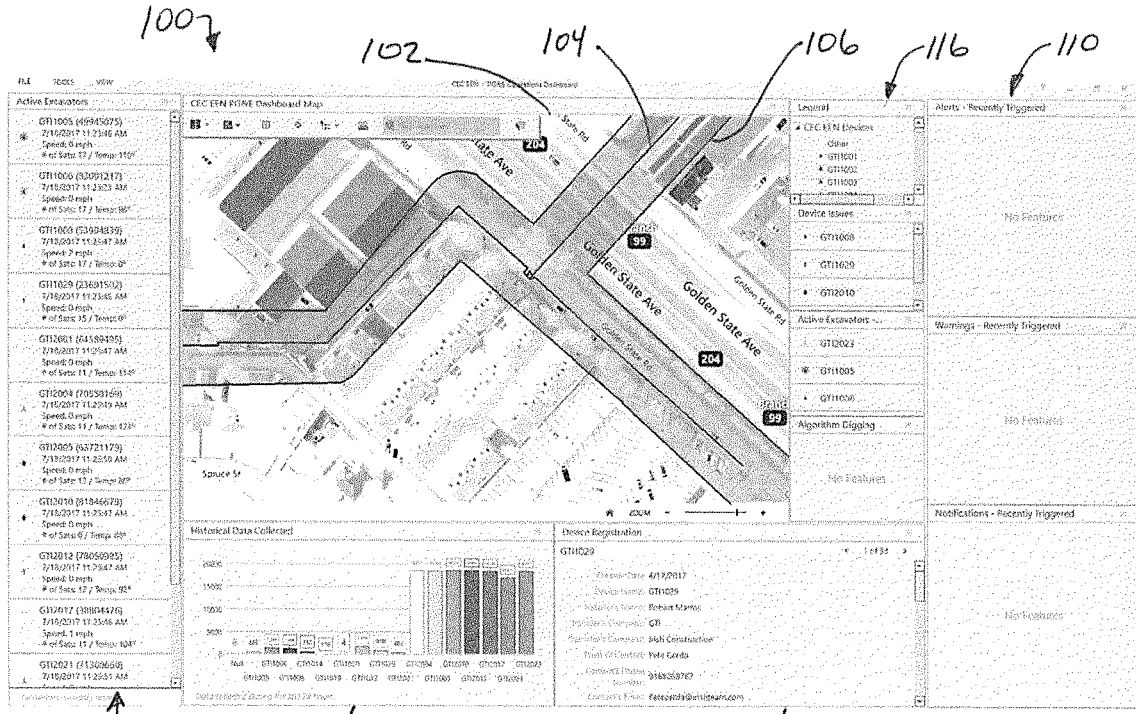

FIG. 3 representatively shows a model data processing architecture 60 for the system and device of this invention. The architecture 60 includes a server structure 62, such as a web server, that includes a server module 70 (e.g., ArcGIS™). The server module 70 includes a geoevent processor 72 that receives streaming event data and converts the data stream to a processed format (such as JavaScript Object Notation). The geoevent processor 72 transfers the processed data to streaming platform 80 and also pushes the data to a spatial data database 78 (e.g., ArcSDE™ (Spatial Database Engine)). The server module 70 also includes a portal 74 (e.g., ArcGISPortal™) for connecting the server module 70 to the operations dashboard 90, which provides, for example, a map view of the sensor data and alert viewing, as shown in FIGS. 5 and 6. The server module 70 also includes an application 76 to configure the data store (e.g., ArcGIS Data Store™).

Streaming platform 80 (e.g., Apache Kafka™) receives the processed event data, and performs further processing to characterize the activity of the working equipment. A processing engine 82 (e.g., Apache Spark™) can be used in combination with the streaming platform to process the data. The processing components 80 and/or 82 are in combination with storage database 86 (e.g., Hadoop Cluster™) and/or search/analytics module 84 (e.g., Elastic Search™).

Figure 4:
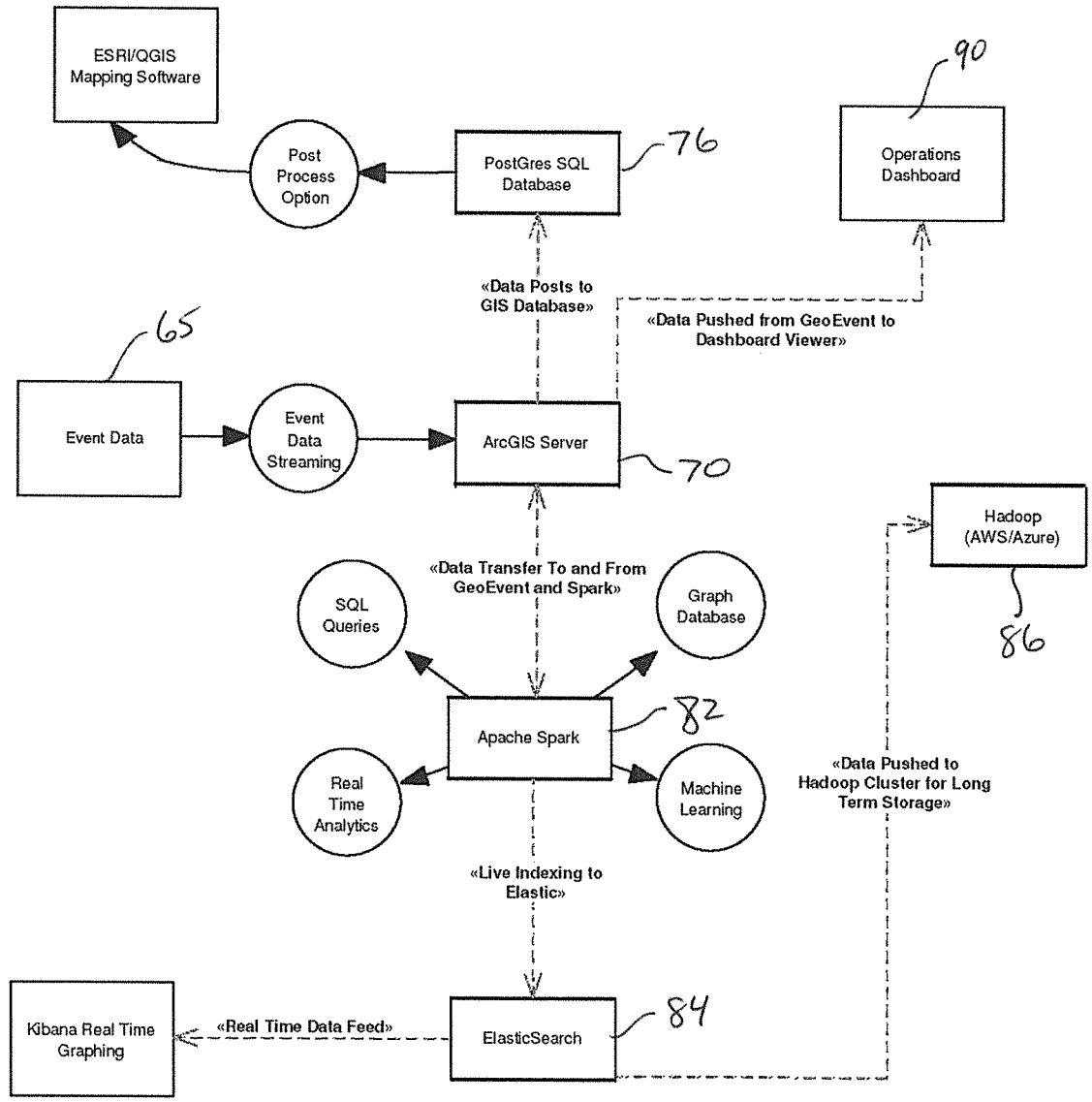
FIG. 4 is a flow diagram of the equipment event data, according to one embodiment of this invention.

FIG. 4 is a flow diagram of the equipment event data according to one embodiment of this invention. The event data 65 is streamed to the server module 70, which in combination with processing engine 82 processes the data to characterize the activity of the construction equipment and pushes the data to both storage 84/86 and the operations dashboard 90.

In embodiments of this invention, the computing module further includes encoded instructions for automatically and continuously characterizing, classifying, and reporting activity of equipment or machinery in real time from motion sensor data sent/received from the device in the field. In embodiments of this invention, the computing module includes encoded instructions for applying a time-based sliding window to the streaming and/or time-varying sensor data and spatial location data to characterize the activity and/or position of the working equipment. The time-based sliding window is a windowing concept that slides with time, essentially providing at each 'window sampling time instance' a varying, but always finite portion of the most recent data. Sliding windows, expressed in time units (e.g., items received during past minute), get refreshed with the advancement of time or the arrival of new data, respectively. Applying the time-based sliding window includes extracting or determining data features from the event data for each sliding window, and comparing the extracted or determined data features for a first sliding window data sampling to a second sliding window data sampling to characterize the activity and/or position of the working equipment.

In one embodiment of this invention, the method for establishing the computational model includes first preprocessing the event data, arranging the data in a desired format, and checking for missing data. Exploratory analysis can be used to compute summary statistics on the data, and to determine desired features useful for a classifier algorithm based on the summary statistics. Exemplary data features include standard deviation, energy, correlation, median, mean, maximum, and/or minimum.

A time-based sliding window is used to sample the data stream for training data. One or more features are calculated from the training data, such as the detected nine degrees of freedom (i.e., acceleration X, acceleration Y, acceleration Z, orientation X, orientation Y, orientation Z, gyroscope X, gyroscope Y, and gyroscope Z). To determine the selected features to train the algorithm, calculations can be run for dimensionality reduction, scaling, and/or relevancy test on features. The algorithm is trained with test data and tested for accuracy and optimized. The algorithm is deployed, such as in the processing engine 82, to use time-based sliding windows on the live data stream to extract features in order to classify the activity of equipment in real-time. The computational model used in this invention has the ability to self-learn from data sent/received from the device in the field, such as by retraining or optimizing the algorithm.

FIGS. 5 and 6 illustrate an exemplary operations dashboard graphical user interface (GUI) 100. The dashboard GUI 100 includes a GIS-based dashboard map 102 showing the utility system 104, and, particularly in the magnified map view 102 of FIG. 6, the shaded buffered boundary 106 established around the components/lines of the utility system 104, and over-laying the GIS/utility system map. The dashboard GUI 100 includes an active equipment window 108, listing each active working equipment by identifier and a status including, without limitation, equipment speed and/or temperature. The dashboard GUI 100 includes an alert window 110 listing, for example, buffered boundary proximity alerts. Additional information windows include historical data window 112, device registration window 114, and map legend window 116.

Thus the invention provides a system and method for monitoring and alerting of a working equipment proximity to a utility system. The invention provides alerts to a device at the working equipment and/or a remote operator dashboard. The invention further includes the establishment of a buffer zone to use in combination with the system to provide a references for the alerts to be triggered.

It will be appreciated that details of the foregoing embodiments, given for purposes of illustration, are not to be construed as limiting the scope of this invention. Although only a few exemplary embodiments of this invention have been described in detail above, those skilled in the art will readily appreciate that many modifications are possible in the exemplary embodiments without materially departing from the novel teachings and advantages of this invention. Accordingly, all such modifications are intended to be included within the scope of this invention, which is defined in the following claims and all equivalents thereto. Further, it is recognized that many embodiments may be conceived that do not achieve all of the advantages of some embodiments, particularly of the preferred embodiments, yet the absence of a particular advantage shall not be construed to necessarily mean that such an embodiment is outside the scope of the present invention.

What is claimed is:

1. An equipment-mounted device comprising a processor and a recordable medium including encoded instructions for collecting and forwarding event data to a processing application that characterizes activity of the equipment and utilizes spatial location information and compares physical movements of equipment with a pre-established buffered boundary at a predetermined distance from or about a physical location of one or more components of a utility system; and further comprising an alarm module adapted to issue an alarm sound or message to an equipment operator as the equipment approaches or contacts the buffered boundary.

2. The device of claim 1, further comprising an equipment-mounted satellite navigation receiver providing the spatial location data as a portion of the event data.

3. The device of claim 1, further comprising a sensor system including at least one equipment-mounted motion sensor, wherein the event data includes motion data from the motion sensor.

4. The device of claim 3, further comprising a nine degree of freedom motion sensor.

5. The device of claim 1, wherein the equipment comprises excavation equipment, agricultural equipment, or construction equipment, and the activity is a ground moving activity.

6. The device of claim 1, further comprising automatically processing the event data in real-time to identify and alert for predicted or potential damage to the utility system.

7. The device of claim 1, wherein the buffered boundary overlays map data and the processing application automatically determines a distance of the physical movements of the equipment from the buffered boundary.

8. The device of claim 1, wherein the buffered boundary comprises a dynamic spatial buffered boundary that is dynamically adjusted as a function of the sensor data and spatial location data as a function of a known information accuracy for the spatial location information of the utility system.

9. A system for monitoring and alerting working equipment movement near utility systems, the system comprising:
a sensor system including at least one motion sensor mounted to the working equipment;
a satellite navigation receiver mounted to the working equipment; and
a computing module in combination with the sensor system and the satellite navigation receiver, the computing module including a processor and a recordable medium including encoded instructions for establishing a predetermined buffered boundary around one or more known components of a utility system, collecting sensor data and spatial location data, characterizing an activity of the working equipment, and comparing, as a function of the spatial location information, physical movements of the equipment with the predetermined buffered boundary established around one or more components of the utility system; and
an alarm module adapted to issue an alarm sound or message to an operator of the working equipment as the working equipment approaches or contacts the buffered boundary.

10. The system of claim 9, wherein the computing module automatically determines a proximity of the working equipment to the buffered boundary as a function of the spatial location data from the satellite navigation receiver and Geographic Information Systems (GIS) data.

11. The system of claim 9, wherein the computing module automatically determines a working motion of the working equipment from motion data determined by the at least one motion sensor and compares the working motion to the buffered boundary.

12. The system of claim 11, further comprising:
a nine degree of freedom motion sensor; and
a housing mounted on the working equipment and at least partially enclosing the motion sensor, the satellite navigation receiver, and the computing module.

13. The system of claim 9, wherein the buffered boundary comprises an imaginary boundary established at predetermined distance from or about the one or more components of the utility system.

14. The system of claim 9, further comprising automatically processing the sensor data and spatial location data in real-time to identify and alert to possible damage to the utility system.

15. The system of claim 9, wherein the computing module automatically determines a distance of the physical movements of the equipment from the buffered boundary.

16. The system of claim 9, further comprising a communication module adapted to wirelessly communicate to a remote electronic device a proximity of the working equipment to the buffered boundary.

17. The system of claim 9, further comprising encoded instructions for applying a time-based sliding window to the sensor data and spatial location data to characterize the activity and/or position of the working equipment.

18. The system of claim 17, wherein applying the time-based sliding window comprises extracting or determining data features from the data for each sliding window, the features selected from standard deviation, energy, correlation, median, mean, a maximum, and/or a minimum, and comparing the extracted or determined data features for a first sliding window data sampling to a second sliding window data sampling to characterize the activity and/or position of the working equipment.

19. The system of claim 9, further comprising encoded instructions for dynamically adjusting the buffered boundary as a function of the sensor data and spatial location data.

\* \* \* \* \*